United States Patent Office 3,480,954
Patented Nov. 25, 1969

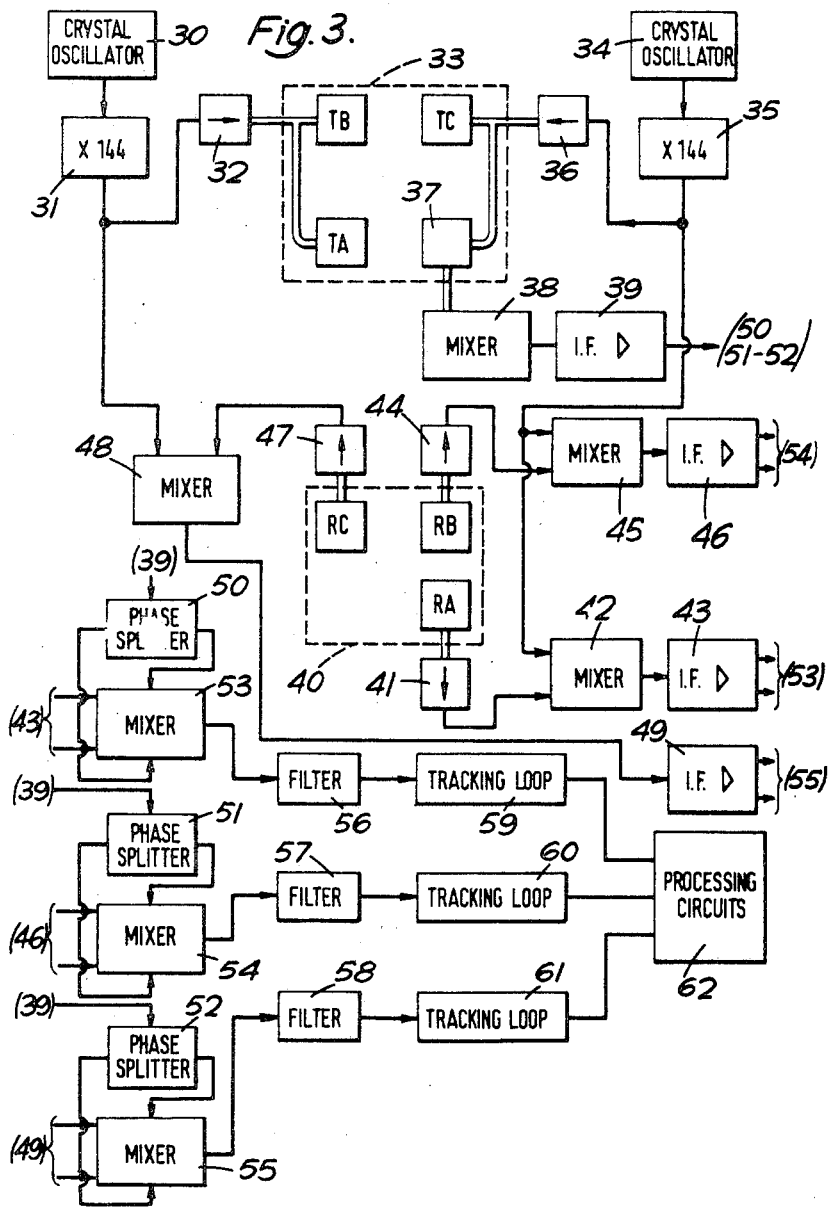

3,480,954
DOPPLER NAVIGATION APPARATUS
Trevor Gray and David Anthony Neish, London, England assignors to Decca Limited, London, England, a British company
Filed Oct. 10, 1968, Ser. No. 766,423
Int. Cl. G01s 9/44
U.S. Cl. 343—8                8 Claims

ABSTRACT OF THE DISCLOSURE

A continuous wave fixed antenna Doppler navigation apparatus that incorporates a Janus system. The signals radiated on the two beams of the system are substantially different. The source oscillator for each beam acts as a local oscillator for heterodyning signals received from areas illuminated by the other beam.

BACKGROUND OF THE INVENTION

This invention relates to Doppler navigation apparatus of the kind which is airborne in use and which incorporates a Janus system.

As is explained, for example, in an article by Clegg and Thorne in the Proceedings of the Institution of Electrical Engineers, Part B, March 1958, pages 235 to 247, in a Janus system electromagnetic signals are fed to an antenna system which directs two beams towards the ground, one directed forwardly and the other backwardly with respect to the direction of the movement, usually but not exclusively fore and aft, for which an indication of the aircraft's velocity is required. For each beam, the frequency or frequencies of the radiated signals are compared with the frequency spectrum of signals received from areas respectively illuminated by the two beams (for example, by mixing the received signals with signals coherent with the respective transmitted signals) and corresponding Doppler signals are obtained. One advantage of a Janus system is its relative insensitivity to normal pitching of the aircraft in the direction of its movement. It will be understood that a complete navigation apparatus can and in practice usually will employ three or more beams in one of a number of well-known configurations. For example, there may be provided two forward looking beams directed with similar depression angles but equal and opposite squint angles with respect to the aircraft's fore and aft axis and a single rearward looking beam. However, for the sake of simplicity the invention will be explained with reference to a two beam system in which the beams normally (i.e. during level flight) illuminate ground areas spaced apart in a direction parallel to the fore-and-aft axis of the aircraft.

As will be hereinafter apparent, the invention is particularly suitable for continuous wave, fixed antenna systems.

The invention is particularly but not exclusively directed towards reducing certain operational problems which occur when navigation over water or sea by helicopters is concerned. It is necessary in such circumstances to use fairly high depression angles for the radiated beams, because the scattering coefficient for electromagnetic waves incident on water or sea falls rapidly with a decrease of depression angle. Furthermore, fixed antenna systems radiating signals of fairly broad beam width are usually employed by reasons of limitations of space and weight and the inconvenience of providing a gyro-stabilised platform for an antenna system. However, if the angle of pitch at a given time is considerable it can happen that, with a large depression angle, signals from an area of sea illuminated by (for example) a side lobe of the forward-looking beam can be received by the part of the antenna system used for receiving signals from the rearward-looking beam and since in this case the effective depression angle for the rearward-looking beam is considerably reduced the amplitude of signals received from the area illuminated by the side lobe of the forward-looking beam will often be greater than the signals received from the area illuminated by the main lobe of the rearward-looking beam. Accordingly considerable distortion of the frequency spectrum pertaining to the received rearward-looking beam is likely and an erroneous indication of Doppler frequency can result. Essentially this can arise because carrier signals of the same frequencies are normally radiated for the two beams and in the situation described above the spurious Doppler frequencies derived from signals received from the area illuminated by the aforementioned side lobe are of the same order as the "correct" Doppler frequencies.

BRIEF SUMMARY OF THE INVENTION

It is the object of the present invention to provide improved Doppler navigation apparatus in which problems caused by pitching of the aircraft in the direction for which velocity indication is required are substantially reduced.

According to the invention, in Doppler navigation apparatus of the aforementioned kind there are provided means to radiate on the two beams of the Janus system signals of substantially different frequencies.

By "substantially different" is meant in general that signals reflected from areas illuminated by one beam do not significantly affect the frequency spectrum of the signals received from areas illuminated by the other beam and more particularly that the frequencies or ranges of frequencies radiated along the two beams are to be separated by at least the highest expected Doppler frequency.

With the present invention, the signals radiated in the forward and backward looking directions are of substantially different frequency and accordingly any Doppler component bearing signal derived from areas illuminated by one beam cannot effect the frequency spectrum of signals received by apparatus normally intended to receive signals from areas illuminated by the other beam.

The present invention has particular application in apparatus in which the received signals are heterodyned to an "intermediate" frequency during the processing of the received frequency spectra to extract the required Doppler components. In such a system it is necessary to provide at least two stable oscillators. One oscillator is used for providing the signals to be transmitted on a beam and the other acts as a "local oscillator" for providing signals which are mixed with the received signals to convert them to an intermediate frequency. With this present invention there may be provided two stable oscillators, each constituting a source of signals for radiation on a respective one of the two beams and also constituting a local oscillator for the heterodyning of signals received from areas normally illuminated by the other beam. With this construction, the invention can readily be put into practice using the same number of stable oscillators as is required for a single frequency system.

BRIEF DESCRIPTION OF THE DRAWINGS

FIGURE 3 is a schematic block diagram illustrating a fixed antenna continuous wave Doppler navigation apparatus embodying the invention.

DETAILED DESCRIPTION OF THE INVENTION AND THE PREFERRED EMBODIMENT

Figure 1:
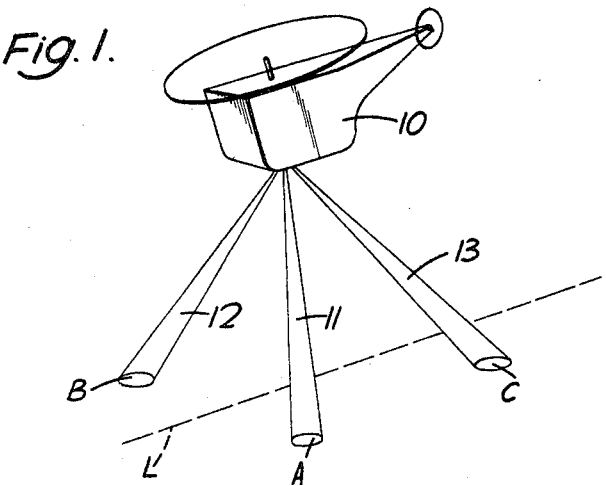
FIGURES 1 and 2 are explanatory diagrams.

FIGURE 1 shows a helicopter 10 and three beams 11, 12 and 13 provided by a Doppler navigation apparatus incorporating a Janus system. The beams 11 and 12 are radiated in a direction forward of the aircraft and in normal level flight illuminate areas A and B spaced apart equally from the fore-and-aft line L. The purpose of radiating two beams in the forward direction is to facilitate measurement of the aircraft's drift and it will be convenient hereinafter to refer only to the beam 11 because in the absence of drift the signals received from the areas A and B are substantially identical. Radiated rearwardly from the aircraft is the beam 13 which illuminates a ground area C which is normally spaced apart in the fore-and-aft direction from the ground area A.

Normally, signals received from the area A via a side lobe of the beam 13 contribute to the frequency spectrum of signals received by a receiving antenna looking at the area C but the effects are small and it is readily possible to construct suitable processing circuits which reduce the spectral distortion produced.

Figure 2:
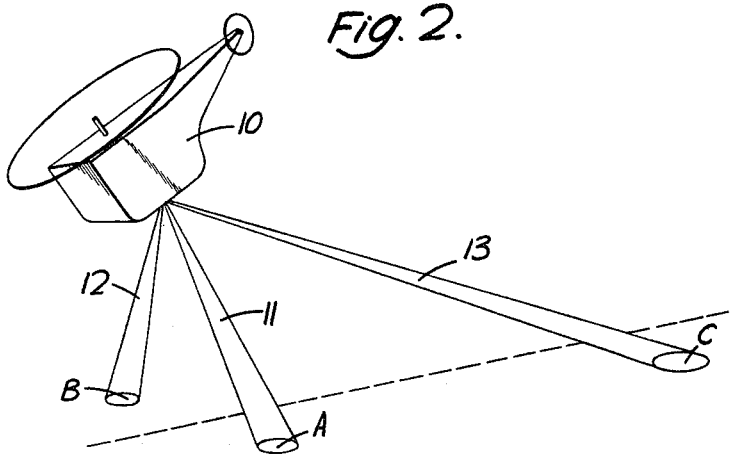

It is now appropriate to consider the situation in FIGURE 2 which shows the helicopter 10 at a considerable forward angle of pitch in the fore-and-aft direction. The area A is now nearer the helicopter. Furthermore, the area C has moved considerably aft of the aircraft and it will be readily apparent that the effective depression angle of the beam 13 has been considerably reduced.

In the situation shown in FIGURE 2 it can frequently happen that owing to the reduction in scattering coefficient with depression angle the signals received from the area C are considerably reduced in amplitude and that the antenna looking at the area C in fact picks up a stronger signal from the area A. Under the circumstances the spectrum of signals received by this antenna is dominated by signals received from the area A and an erroneous indication of Doppler frequency will result. This arises because the same frequencies are used for the beams 11 and 13 so that the frequencies of the signals received from areas C and A are of the same order of magnitude.

The present invention seeks to alleviate the problems caused by a situation such as is shown in FIGURE 2 by providing different radiated frequencies for the beams 11 and 13. The frequency difference will be sufficient to prevent any erroneous indication arising from, for example, the reception of signals from area A by that part of the antenna system intended to receive signals from area C. A schematic diagram of apparatus suitable for this purpose is shown in FIGURE 3.

In FIGURE 3, a highly stable crystal oscillator 30 feeds a continuous wave signal to a varactor multpilier 31 which multiplies the signal from the oscillator 30 by 144 to produce an output signal at 13,325 mHz.

This signal is fed through a circulator 32 to two radiating antenna elements TA and TB. These provide the radiated beams 11 and 12 towards the areas A and B of FIGURE 1 respectively. In the antenna system 33 which includes the elements TA and TB is a further element TC which when energised provides the beam 13 towards the area C in FIGURE 1. Signals for this antenna element are derived from a stable crystal oscillator 34 feeding a varactor multiplier 35 which multiplies the oscillator signal by 144 to provide an output at 13,314.3 mHz.; these signals are fed through a circulator 36 to the antenna element TC.

It will be noted that the outputs from the oscillating arrangements differ by 10.7 mHz. which is used as in intermediate frequency in the system. For providing a reference signal at 10.7 mHz. a reference mixer 38 is arranged to receive leakage signals from the elements TB and TC through the antenna element 37 and to feed these signals after mixing and filtering to a "reference" I.F. (intermediate frequency) amplifier 39.

Signals from the areas A, B and C are picked up by an antenna system 40 comprising separate receiving elements RA, RB and RC for the three areas respectively. It will be appreciated that either in-phase or anti-phase antenna arrangements can be used without affecting the main features of the invention: in the system shown an anti-phase arrangement is used.

The signals received at the element RA are fed through a circulator 41 to a mixer 42 which mixes the received signals with part of the output of the multiplier 35. It will be recalled that this multiplier provided the signals to be transmitted for the beam C and it (together with its associated oscillator) is here being used as a "local oscillator" to provide signals for heterodyning the signals received from the antenna pertaining to the "other" beam. in this case beam A. The output of the mixer 42 is fed to an intermediate frequency amplifier 43. Likewise, signals received by the element RB are fed through a circulator 44 to a mixer 45 mixing the received signals again with part of the output of multiplier 35, the signals at the intermediate frequency being fed to a further IF amplifier 46.

The signals picked up by the antenna element RC are passed through a circulator 47, mixed in a mixer 48 with part of the output of the multiplier 31 and fed to an intermediate frequency amplifier 49.

The remainder of the system can be readily constructed on conventional lines, due allowance being made for the different Doppler component due to fore-and-aft motion obtained even in level flight from the area C and the other two areas.

Accordingly, the outputs of each amplifier 43, 46 and 49 are separately mixed by mixers 53 to 55 with quadrature outputs from the reference IF amplifier, the quadrature outputs in each case being obtained by one of the phase splitters 50 to 52, and, after appropriate filtration in respective filters 56 to 58 are fed to a respective conventional tracking loop 59, 60 or 61. As is well-known each tracking loop is operative to extract the center frequency from a spectrum of frequencies from the respective channel, the extracted Doppler frequencies being fed out to the processing circuits 62 which will obtain the required indications of aircraft velocity.

The circulators are provided to prevent spill-over of unwanted frequencies in the wrong channels. For example, spill-over of 13,314.3 mHz. signals from the radiating element TC to the element TB and into the mixer 48 ir prevented.

It will be readily apparent that the invention is (for example) applicable to systems employing frequency modulation of the transmitted signals.

We claim:

1. In a Doppler navigation apparatus comprising signal generating means, an antenna system coupled for energisation by said signal generating means and constructed to provide two beams of electromagnetic radiation in a Janus configuration, and Doppler signal extraction means responsive to signals received by said antenna system: the improvement which comprises two signal generating means providing simultaneous output signals of substantially different frequencies and means coupling said generating means to said antenna system so that the said beams are simultaneously constituted by electromagnetic radiation of substantially different frequencies.

2. The structures set forth in claim 1 further comprising first and second heterodyning means for heterodyning the signals received from areas normally illuminated by the respective beams, the signal generating means for signals radiated on a first one of said beams being coupled as a local oscillator to the heterodyning means for the signals received from areas normally illuminated by the second of the two beams, and the signal generating means for signals radiated on the second beam being coupled as a local oscillator to the heterodyning means for the signals received from areas normally illuminated by the first beam.

3. A Doppler navigation system comprising: an antenna system having first and second transmitting elements disposed to direct first and second beams of electromagnetic radiation in a Janus configuration and first and second receiving elements disposed to receive signals reflected from areas illuminated by the said first and second beams respectively; first and second stable generating means providing simultaneous output signals of substantially different frequencies; feed means coupling the first transmitting element for energisation by the first stable generating means, feed means coupling the second transmitting element for energisation by the second stable generating means; reference means providing reference frequency signals; first Doppler signal extraction means coupled to said first receiving element and said reference means; and second Doppler signal extraction means coupled to said second receiving element and said reference means.

4. A system as set forth in claim 3 in which each said stable generating means comprises a crystal oscillator coupled to feed a multiplier and each said Doppler signal extraction means comprises a frequency tracking loop.

5. A Doppler navigation apparatus comprising: an antenna system having first and second transmitting elements disposed to direct first and second beams of electromagnetic radiation in a Janus configuration and first and second receiving elements disposed to receive signals reflected from areas illuminated by the said first and second beams respectively; first and second stable generating means providing output continuous wave signals of substantially different frequencies; feed means coupling the first transmitting element for energization by the first stable generating means, feed means coupling the second transmitting element for energization by the second stable generating means; reference means providing reference frequency signals; first Doppler signal extraction means coupled to said first receiving element and said reference means; second Doppler signal extraction means coupled to said second receiving element and said reference means; first and second mixer means each having two inputs and an output, said first Doppler signal extraction means being coupled to the output of said second mixer means, and said second Doppler signal extraction means being coupled to the output of said first mixer means; means coupling the inputs of said first mixer means to receive the output signals of said first generating means and to said second receiving element respectively; and means coupling the inputs of said second mixer means to receive the output signals of said second generating means and to said first receiving element respectively.

6. Apparatus as set forth in claim 5 in which each said stable generating means comprises a crystal oscillator coupled to feed a varactor multiplier.

7. Apparatus as set forth in claim 5 in which each Doppler signal extraction means comprises a frequency tracking loop.

8. Apparatus as set forth in claim 5 in which each said feed means comprises a circulator.

References Cited

UNITED STATES PATENTS

| | | | |
|---|---|---|---|
| 3,243,808 | 3/1966 | Eldred | 343—8 |
| 3,302,161 | 1/1967 | Ellison | 343—9 X |
| 3,327,307 | 6/1967 | Miles | 343—8 X |

RICHARD A. FARLEY, Primary Examiner

U.S. Cl. X.R.

343—9